US007116880B1

(12) United States Patent
Liu et al.

(10) Patent No.: US 7,116,880 B1
(45) Date of Patent: Oct. 3, 2006

(54) DECREASED CROSSTALK IN ADJACENT PHOTONIC WAVEGUIDES

(75) Inventors: Xueyuan Liu, Webster, NY (US); Yao Rong Wang, Webster, NY (US); Kristine A. German, Webster, NY (US); Peter M. Gulvin, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/170,869

(22) Filed: Jun. 30, 2005

(51) Int. Cl.
*G02B 6/10* (2006.01)
(52) U.S. Cl. .................. 385/129; 385/131; 385/130
(58) Field of Classification Search ................. 385/129
See application file for complete search history.

(56) References Cited

U.S. PATENT DOCUMENTS

| 5,157,756 | A | 10/1992 | Nishimoto |
| 5,703,989 | A | 12/1997 | Khan et al. |
| 6,574,381 | B1* | 6/2003 | Stoddard et al. ............. 385/2 |
| 6,895,136 | B1 | 5/2005 | Deliwala |
| 2003/0118267 | A1* | 6/2003 | Kimber et al. ............. 385/14 |
| 2003/0161579 | A1* | 8/2003 | Yan et al. .................. 385/37 |
| 2004/0228570 | A1* | 11/2004 | Logvin et al. ............. 385/15 |
| 2005/0175305 | A1* | 8/2005 | Liu et al. .................. 385/129 |

OTHER PUBLICATIONS

Dumon et al., "Low-loss photonic wires and compact ring resonators in silicon-on-insulator", Proceedings Symposium IEEE/LEOS Benelux Chapter, pp. 5-8 (2003).
Fukazawa et al., "Low Loss Intersection of Si Photonic Wire Waveguides", Japanese Journal of Applied Physics, vol. 43, No. 2, pp. 646-647 (2004).
Jalali et al., "Advances in Silicon-on-Insulator Optoelectronics", IEEE Journal of Selected Topics in Quantum Electronics, vol. 4, No. 6, pp. 938-947 (1998).
Johnson et al., "Elimination of cross talk in waveguide intersections", Optics Letters, vol. 23, No. 23, pp. 1855-1857 (1998).
Li et al., "Small-area bends and beamsplitters for low-index-contrast waveguides", Optics Express, vol. 11, No. 3, pp. 282-290 (2003).
Nordin et al., "Hybrid integration of conventional waveguide and photonic crystal structures", Optics Express, vol. 10, No. 23, pp. 1334-1341 (2002).
Soref et al., "Large Single-Mode Rib Waveguides in GeSi-Si and Si-on-SiO$_2$", IEEE Journal of Quantum Electronics, vol. 27, No. 8, pp. 1971-1974 (1991).

* cited by examiner

*Primary Examiner*—Michelle Connelly-Cushwa
*Assistant Examiner*—Eric Wong
(74) *Attorney, Agent, or Firm*—Miele Law Group PC

(57) ABSTRACT

First and second ridge type photonic waveguides are provided. Each of the waveguides includes a core layer and a reflective cladding layer in continuous contact with a first side of a core layer. The core layer has a core index of the refraction and is formed in a ridge in a dimension and shape to impose lateral confinement. The reflective cladding layer has an index of refraction that is substantially different than the core index of refraction. An inter-waveguide slab portion is provided between the first and second waveguides. A substrate supports the first and second waveguides, the slab portion, and the reflective cladding layer. A light interceptor region is provided to hinder a transfer of photons between the first and second waveguides through the inter-waveguides slab portion. The light interceptor region may include a trench region, which is an air gap in one embodiment.

15 Claims, 5 Drawing Sheets

DECREASED CROSSTALK IN ADJACENT PHOTONIC WAVEGUIDES

STATEMENT REGARDING FEDERALLY SPONSORED RESEARCH OR DEVELOPMENT

This disclosure was made with support from the National Institute of Standards and Technology ATP program Cooperative Agreement No. 70NANB8H4014. The U.S. Federal Government may have certain rights in this disclosure.

BACKGROUND OF THE DISCLOSURE

Aspects of the present disclosure relate to photonic wires, otherwise referred to as photonic waveguides. Other aspects relate to methods to reduce crosstalk between adjacent photonic waveguides.

Optoelectronics, otherwise called photonics, may form the basis for a new generation of circuits, that manipulate photons in the creation of sophisticated networks, systems, and devices. Photonic circuits can provide, among other benefits, speed and low-noise performance.

Silicon-on-insulator (SOI) is a popular platform for implementing photonic components and integrated circuits. SOI platforms have optical properties well suited to the creation of waveguides and other photonic components. In addition, SOI platforms are considered to be more readily compatible with silicon CMOS integrated circuit processes than are other photonic platforms. For example, some such silicon CMOS processes include deep UV lithography.

Photonic circuits also employ platforms based on III–IV semiconductors such as gallium arsenide (GaAs) and indium phosphide (InP) compounds.

BRIEF SUMMARY OF THE DISCLOSURE

In accordance with the one aspect of the disclosure, apparatus are provided which include first and second ridge type photonic waveguides. Each of the waveguides includes a core layer, which has a core index of refraction, and is formed in a ridge of a dimension and shape to impose lateral confinement. Each of the waveguides further includes a reflective cladding layer in continuous contact with a first side of the core layer. The reflective cladding layer has an index of refraction substantially different than the core index of refraction. An inter-waveguide slab portion is provided between the first and second waveguides. A substrate supports the first and second waveguides and the slab portion. A light interceptor region is provided to hinder the transfer of photons between the first and second waveguides through the inter-waveguide slab portion.

BRIEF DESCRIPTION OF THE DRAWINGS

Embodiments are described in the detailed description as follows, by reference to the noted drawings, in which like reference numerals represent similar parts throughout the several views of the drawings, and wherein.

DETAILED DESCRIPTION

Figure 1:
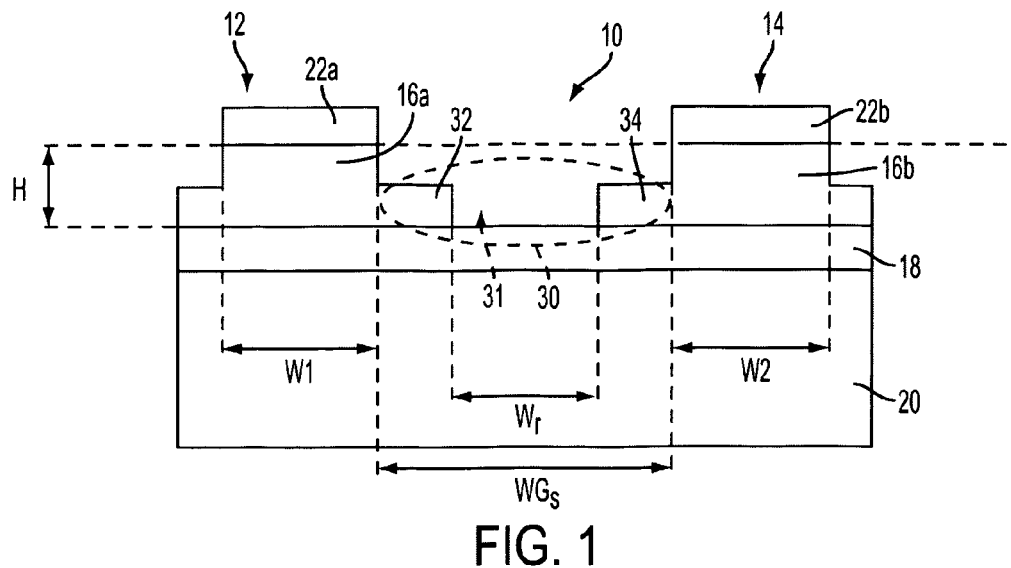
FIG. 1 is a cross-sectional view of one embodiment of an optoelectronic waveguide structure.

Referring now to the drawings in greater detail, FIG. 1 illustrates a cross-sectional view of an optoelectronic waveguide structure, which structure has a plurality of waveguides, and a structure to reduce or eliminate crosstalk among those waveguides. Specifically, as shown in FIG. 1, the illustrated optoelectronic waveguide structure 10 comprises a first waveguide 12 and a second waveguide 14. These waveguides include ridge type photonic waveguides, each including a core layer 16a, 16b. Each core layer 16a, 16b is formed in a ridge of a dimension and shape so as to impose lateral confinement. The core layer may, for example, be configured to serve as a single-mode optical waveguide.

In the embodiment illustrated in FIG. 1, the ridge structure of each of the first and second waveguides 12, 14 has a width W1 and W2 of approximately 5 μm (micrometers), and the height of each of the waveguides H is 5 μm. The slab in the illustrated embodiment is 2 μm. Such a ridge waveguide structure for each of the first and second waveguides 12, 14 is single-mode near the wavelength of 1.55 μm for both the TE and TM polarizations. Single-mode characteristics for these waveguides can be maintained when the relationships among the waveguide height, width, and slab height satisfy certain conditions. Each of first waveguide 12 and second waveguide 14 (and other waveguides not specifically shown in the figure) may be straight or curved.

There may be a transfer of power between adjacent waveguides, otherwise called crosstalk. Crosstalk will worsen the performance of the resulting integrated optical circuit. Crosstalk may be reduced by increasing the separation between adjacent waveguides. In addition, or as an alternative, to increasing the separation between the waveguides, the structure 10 illustrated in FIG. 1 includes a light interceptor region 31 between the adjacent waveguides 12, 14.

More specifically, the illustrated structure 10 further includes, for each of the waveguides, a reflective cladding layer 18 in continuous contact with a first side of core layer 16a, 16b. The reflective cladding layer 18 has an index of refraction that is substantially different than the core index of refraction of the core layer 16a, 16b.

In the embodiment illustrated in FIG. 1, core layer 16a, 16b is made of single crystal silicon, while reflective cladding layer 18 is made of silicon dioxide ($SiO_2$).

The illustrated structure 10 further includes an inter-waveguide slab portion 30 which extends between the first and second waveguides 12, 14. The slab portion 30 extends laterally from the core layer 16a, 16b. A substrate 20 supports the first and second waveguides 12, 14, the slab portion 30, and the reflective cladding layer 18.

A light interceptor region 31 is provided to hinder the transfer of photons between the first and second waveguides 12, 14 through the inter-waveguide slab portion 30. In the embodiment shown in FIG. 1, the light interceptor region 31 includes an air gap separating a slab portion 32 of the first waveguide from a slab portion 34 of the second waveguide.

An optional upper cladding layer 22a, 22b may be provided, otherwise referred to as a second cladding layer, which is in continuous contact with a second side of the core layer of each of the waveguides. The second side of the core layer is more distant from the substrate than the first side of the core layer. In the structure illustrated in FIG. 1, the second cladding layer is an upper cladding layer. In the illustrated embodiment, the upper cladding layer is made of silicon dioxide.

The width of each of the waveguides 12, 14 can be the same or different. Accordingly, the width W1 of the first waveguide may be equal to or different than the width W2 of the second waveguide. The width WT of the trench air gap is determined so as to obtain the desire hindrance of the transfer of photons between the first waveguide 12 and the second waveguide 14. $WG_S$ is the waveguide separation amount. In the illustrated embodiment, the width of the trench air gap is 2 μm. The waveguide separation $WG_S$ may be varied depending upon the design of the optoelectronic circuit. The following observations were made in a simulation performed of the illustrated circuit: The crosstalk resulting from a separation amount of $WG_S=6$ μm was 40 dB without any trench air gap, while the crosstalk with a 2 μm trench air gap was 60 dB. With a waveguide separation $WG_S$ of 5 μm, the crosstalk was 37 dB with no trench air gap, while the crosstalk was 53 dB with a 2 μm trench air gap. With a waveguide separation $WG_S$ of 4 μm, the crosstalk with no trench air gap was 35 dB, while the crosstalk with a 2 μm trench air gap was 50 dB. With a waveguide separation $WG_S$ of 2 μm, the crosstalk with no trench air gap was 28 dB, while the crosstalk with a 2 μm trench air gap was 47 dB.

In the embodiment in FIG. 1, the thickness of the reflective cladding layer 18 is 1 μm.

Figure 2:
FIGS. 2–7 show various phases of an optoelectronic waveguide structure in its production.

Referring to FIG. 2, a first phase of a method of manufacturing the structure of FIG. 1 is shown, wherein a base substrate 20 is provided. In the illustrated embodiment, the base substrate 20 comprises single crystal silicon. Its thickness may be as small, e.g., as 1.0 μm, 500 μm, or more. In the illustrated embodiment, the substrate has a refractive index of approximately 3.5. Alternatively, no substrate may be provided.

Figure 3:
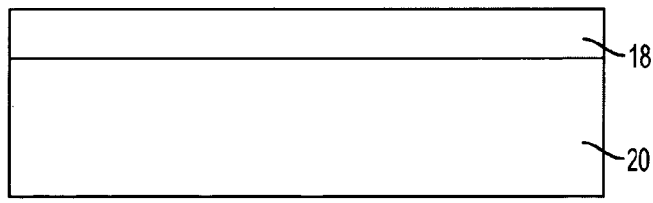
Figure 4:
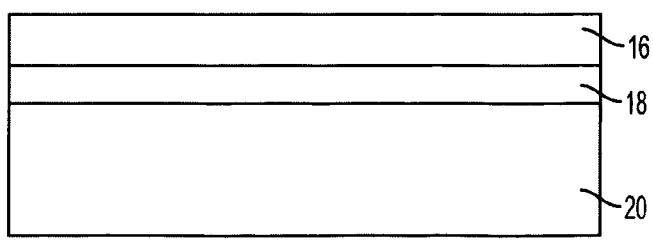

As shown in FIG. 3, a reflective cladding layer 18 including silicon dioxide is formed on semiconductor base substrate 20. This may be done, for example, by thermal oxidation of the silicon base substrate. FIG. 4 shows a core layer of single crystal silicon 16 formed onto the lower reflective cladding layer 18. This may be done, for example, by bonding a single crystal silicon layer to the cladding layer and then grinding layer 16 to a desired thickness.

Figure 5:
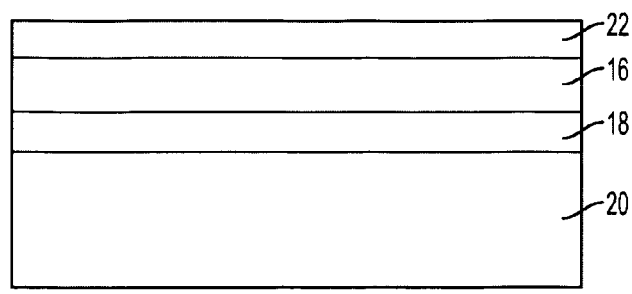

FIG. 5 shows an optional upper cladding layer 22 on top of the core layer 16, which, if provided, could be, for example, formed using plasma-enhanced chemical vapor deposition (PECVD). Each of the layers of the structure as shown in FIG. 5 may be deposited using an epitaxial growth technique such as liquid-phase epitaxy, molecular beam epitaxy, metal-organic vapor-phase epitaxy or metal-organic molecular beam epitaxy.

Figure 6:
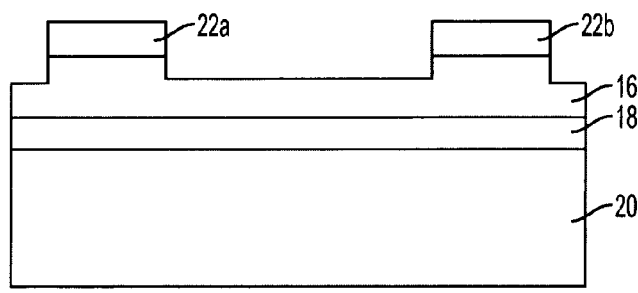
Figure 7:
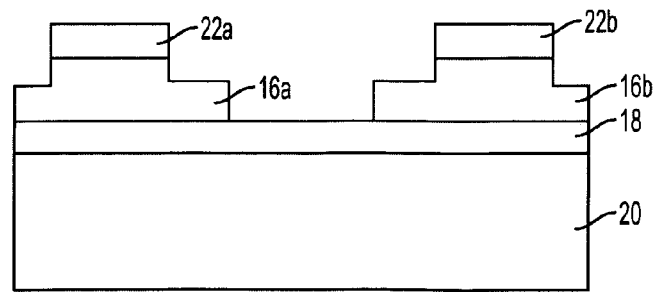

FIG. 6 illustrates the structure after patterning, for example, with etch masking, to create the ridge structure of each of the first and second waveguides. FIG. 7 illustrates the resulting structure upon further etching of the trench 31. The etching performed in FIGS. 6 and 7 may, for example, be performed by reactive ion etching.

Figure 8:
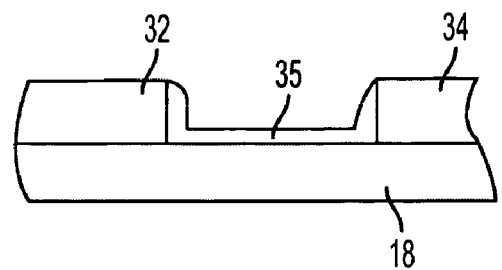
FIGS. 8–13 show variations of an inter-waveguide slab portion and of a light interceptor region.

FIG. 8 illustrates a varied structure for the light interceptor region 31. As illustrated in FIG. 8, the light interceptor region 31 may include a trench, separating the slab extension 32 of the first waveguide and the slab extension 34 of the second waveguide, partially filled with a substance 35. The substance 35 may include a dielectric anti-reflection coating. For example, the substance 35 may include hafnium oxide (HfO). Alternatively, substance 35 may include a metal film, such as, aluminum. In the embodiment illustrated in FIG. 8, substance 35 is formed within the trench only partially to cover the side wall and bottom surfaces of the trench. Alternatively substance 35 could completely fill the trench, with either a dielectric anti-reflection coating or metal film, or a combination thereof, using any one of the specific substances noted above by way of example.

Figure 9:
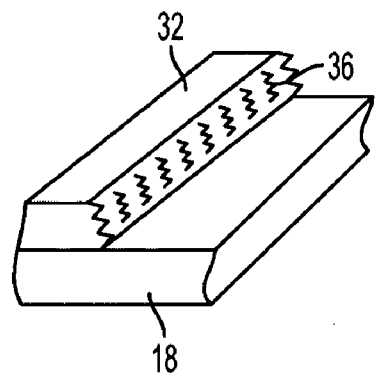

FIG. 9 illustrates one side of a trench of a light interceptor region 31, where a wall 36 of the trench is roughened to increase scattering out of the optical plane. In other words, light emitting out of the slab extension 32 of the first waveguide will be scattered to a greater extent. This further hinders the transfer of photons from the first waveguide to the second waveguide.

Figure 10:
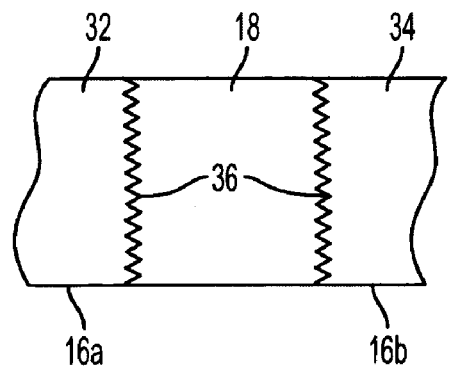

FIG. 10 shows side walls 36 of the trench shown in FIG. 9 from a top view. The side walls of the trench may be provided with uniform or random roughened patterns. For example, a zig zag design or pattern may be formed on each of these side walls 36 of the trench. A zig zag pattern, either random or uniform, may be formed, for example, with plane patterning. Alternatively, the roughness of the side walls 36 may be formed from process, for example, using a Bosch etch.

Figure 11:
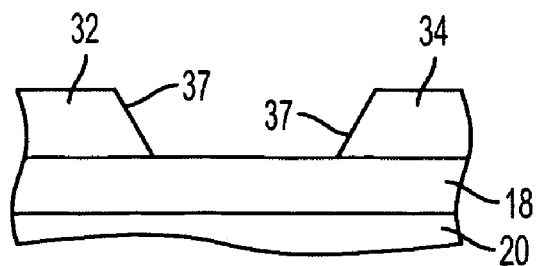

FIG. 11 is a cross-sectional view of the light interceptor region 31 of a waveguide structure, where the side walls 37 of the trench are sloped to increase scattering out of the optical plane of each of the waveguides 32, 34.

Figure 12:
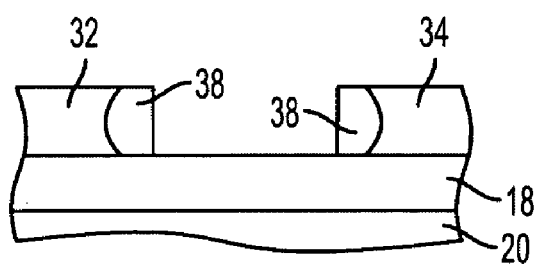

FIG. 12 is a cross-sectional view of the light interceptor region 31 portion of the waveguide structure, where the regions adjacent to the side walls of the trench 38 are doped. These regions may be doped from the edge of each side wall into an extended portion towards the waveguide by an amount equal to, for example, $10^{17}/cm^3$. Doping may be with, for example, doping using phosphorus or arsenic for n-type doping, and boron for p-type doping. Doping involves placing extra electrons or holes in a given region, causing the absorption of photons, converting them to phonons.

Figure 13:
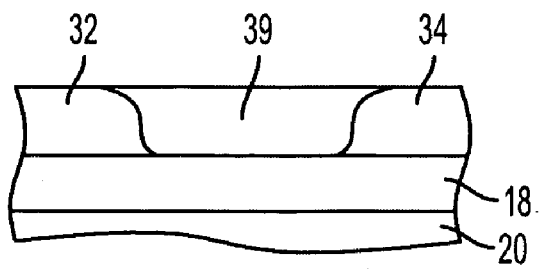

FIG. 13 shows a cross-sectional view of a light interceptor region 31 portion of the waveguide structure, wherein the trench is a doped region 39 rather than an air gap. Here, as noted above with respect to FIG. 12, the doped region 39 may be formed by doping the core layer extensions 32, 34, which meet each other in this embodiment, for example, with phosphorus or arsenic for n-type doping or with boron for p-type doping.

Figure 14:
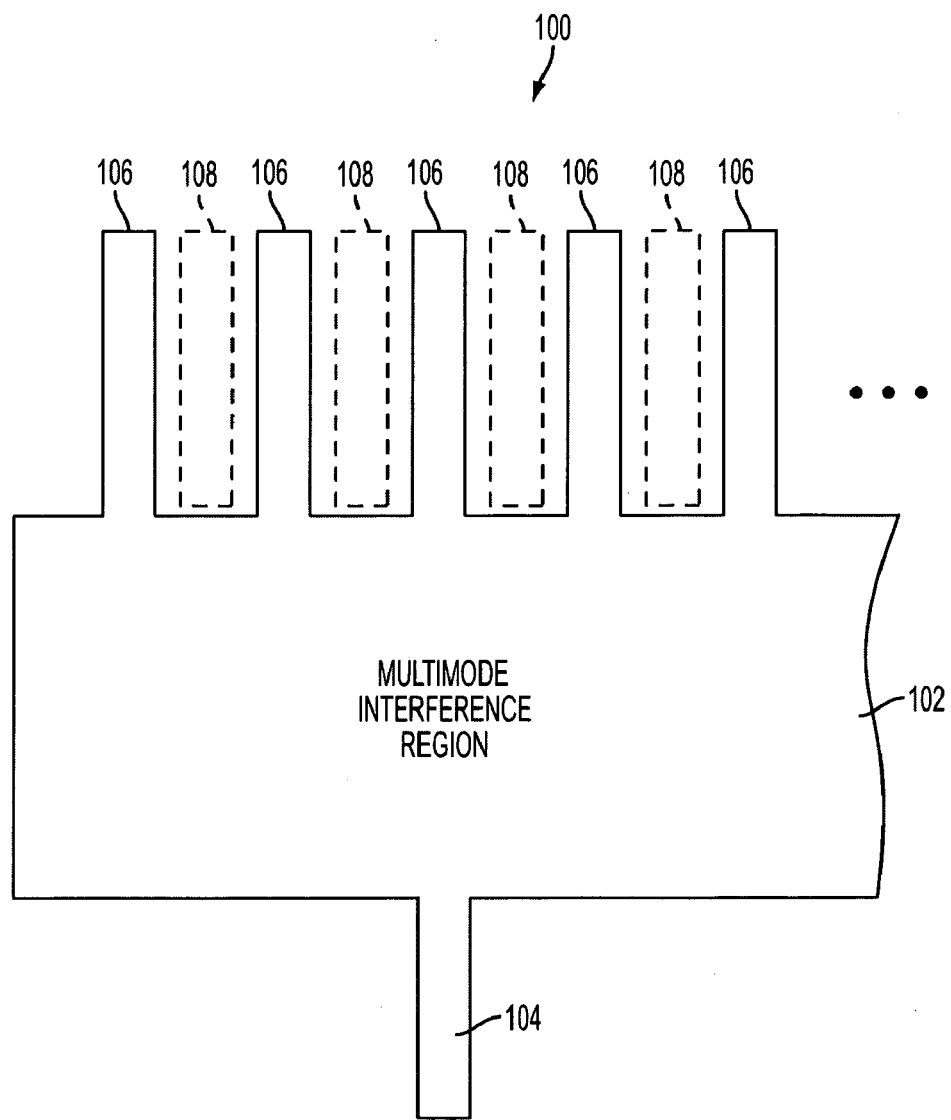
FIG. 14 illustrates a top view of a splitter/grating optoelectronic waveguide structure.

FIG. 14 provides a top view of a splitter/grating optoelectronic structure 100 (acting as a splitter in one direction or as a grating in another direction). The illustrated structure 100 includes a multi-mode interference region 102 coupling a plurality of split mode waveguides 106 at one side to a single waveguide 104 at the other side. A light interceptor region 108 is provided between adjacent pairs of the split mode waveguides 106, to reduce or prevent crosstalk. Each of the light interceptor regions 108 may be configured or implemented as described above in FIGS. 1–13.

In the embodiments herein, a photonic circuit refers, for example, to a circuit of photonic components. The components may include, for example, components for generating, transmitting, manipulating, and/or detecting light. Photonic circuits may refer in embodiments herein, for example, to such circuits that also have electronic components. In embodiments herein, an optoelectronic integrated circuit (OEIC) or photonic integrated circuit refers, for example, to a circuit on which several or many optical components are integrated, often also including electronic components. In embodiments herein, a monolithically integrated circuit refers, for example, to a circuit on which all components are fabricated on a single substrate while avoiding post production assembly and alignment of the components. The structures described herein may be fabricated using wafer-scale technology, using lithography on substrates/chips. The technology may involve III–V components, gallium arsenide (GaAs), indium phosphide (InP), silicon germanium (SiGe), or silicon technologies. In addition, each structure described herein may be combined or formed into a photonic circuit, an optoelectronic integrated circuit, and/or a monolithically integrated circuit.

The claims as originally presented, and as they may be amended, encompass variations, alternatives, modifications, improvements, equivalents, and substantial equivalents of the embodiments and the teachings disclosed herein, including those that are presently unforeseen or unappreciated, and that, for example, may arise from applicants/patentees, and others.

What is claimed is:

1. Apparatus comprising:
    first and second ridge type photonic waveguides, each of the first and second waveguides including a core layer having a core index of refraction, the core aver being formed to have both a ridge of a dimension and shape to impose lateral confinement and a laterally extending slab extension, and each of the first and second waveguides further including a reflective cladding layer in continuous contact with a first side of the core layer, the reflective cladding layer having an index of refraction substantially different than the core index of refraction;
    an inter-waveguide slab portion between the first and second waveguides;
    a substrate supporting the first and second waveguides, the slab portion, and the reflective cladding layer; and
    a light interceptor region to hinder a transfer of photons between the first and second waveguides through the inter-waveguide slab portion.

2. The apparatus according to claim 1, wherein the core layer serves as a single-mode optical waveguide and includes single crystal silicon, wherein the reflective cladding layer includes silicon dioxide, and wherein the index of refraction of the reflective cladding layer is lower than the core index of refraction.

3. The apparatus according to claim 2, further comprising a second cladding layer in continuous contact with a second side of the core layer, the second side being more distant from the substrate than the first side of the core layer.

4. The apparatus according to claim 3, wherein the second cladding layer includes silicon dioxide.

5. The apparatus according to claim 4, wherein the light interceptor region includes a trench region separating the slab extension of the first waveguide from the slab extension of the second waveguide.

6. The apparatus according to claim 5, wherein the trench region includes an air gap separating the slab extension of the first waveguide from the slab extension of the second waveguide.

7. The apparatus according to claim 5, wherein the trench region includes a doped region.

8. The apparatus according to claim 5, wherein the trench region includes both a central air gap and a doped region at a sidewall of the slab extension of the first waveguide and at a side wall of the slab extension of the second waveguide.

9. The apparatus according to claim 6, wherein the air gap of the trench is bounded by a sloped sidewall of the slab extension of the first waveguide and of the slab extension of the second waveguide, each of the sloped sidewalls sloping so that a separation formed by the air gap is greater at portions further away from the substrate.

10. The apparatus according to claim 6, further including a dielectric anti-reflection substance formed in the trench region.

11. The apparatus according to claim 6, further including a metal coating on side and floor surfaces of the trench region.

12. The apparatus according to claim 5, wherein the trench region is filled with a dielectric anti-reflection coating.

13. The apparatus according to claim 5, wherein the trench region is filled with a metallic substance.

14. The apparatus according to claim 5, wherein the trench region has walls at facing ends of the slab extensions of the first and second waveguides, each of the walls having a rough or jagged surface.

15. Apparatus comprising:
    first and second ridge type photonic waveguides, each of the first and second waveguides including a core layer having a core index of refraction, the core layer being formed to have both a ridge of a dimension and shape to impose lateral confinement and a laterally extending slab extension;
    an inter-waveguide slab portion between the first and second waveguides, the slab portion; and
    a light interceptor region to hinder a transfer of photons between the first and second waveguides through the inter-waveguide slab portion.

* * * * *